United States Patent
Pyapali et al.

(10) Patent No.: US 7,890,909 B2
(45) Date of Patent: Feb. 15, 2011

(54) AUTOMATIC BLOCK COMPOSITION TOOL FOR COMPOSING CUSTOM BLOCKS HAVING NON-STANDARD LIBRARY CELLS IN AN INTEGRATED CIRCUIT DESIGN FLOW

(75) Inventors: Rambabu Pyapali, Cupertino, CA (US); Peter F. Lai, San Jose, CA (US); Ju H. Yew, San Jose, CA (US); Xi-An Xu, Cupertino, CA (US); Xiaochun Gao, San Jose, CA (US)

(73) Assignee: Oracle America, Inc., Redwood City, CA (US)

( * ) Notice: Subject to any disclaimer, the term of this patent is extended or adjusted under 35 U.S.C. 154(b) by 453 days.

(21) Appl. No.: 11/968,311

(22) Filed: Jan. 2, 2008

(65) Prior Publication Data

US 2009/0172622 A1    Jul. 2, 2009

(51) Int. Cl.
G06F 17/50        (2006.01)
(52) U.S. Cl. .............................................. 716/13; 716/1
(58) Field of Classification Search ..................... 716/1, 716/10, 13
See application file for complete search history.

(56) References Cited

U.S. PATENT DOCUMENTS

| | | |
|---|---|---|
| 5,768,479 A | 6/1998 | El-Karim |
| 6,539,528 B2 | 3/2003 | Hwang |
| 6,539,533 B1 * | 3/2003 | Brown et al. ................... 716/17 |
| 2002/0029371 A1 * | 3/2002 | Hwang et al. ................. 716/10 |
| 2003/0121019 A1 * | 6/2003 | Brown et al. ................... 716/12 |
| 2008/0134106 A1 * | 6/2008 | Riviere-Cazaux .............. 716/2 |

* cited by examiner

*Primary Examiner*—Jack Chiang
*Assistant Examiner*—Suchin Parihar
(74) *Attorney, Agent, or Firm*—Meyertons, Hood, Kivlin, Kowert & Goetzel, P.C.; Stephen J. Curran (57) ABSTRACT

An automatic custom block composition tool for composing custom blocks of an integrated circuit (IC) design that may include non-standard library cells. The tool includes program instructions that are executable to create and use a placement control file that includes instructions for use by the custom block composition tool to place the one or more non-standard library cells into the custom block layout. In addition, the program instructions may instantiate a leafcell for each non-standard and each standard library cell included in a netlist. The program instructions may access the placement control file and place each leafcell in a row of the custom block layout according to the placement control file. The program instructions may also pre-route power, clock and critical network signals, and generate a router control file used during remaining routing of the custom block by a conventional router tool.

21 Claims, 7 Drawing Sheets

AUTOMATIC BLOCK COMPOSITION TOOL FOR COMPOSING CUSTOM BLOCKS HAVING NON-STANDARD LIBRARY CELLS IN AN INTEGRATED CIRCUIT DESIGN FLOW

BACKGROUND OF THE INVENTION

1. Field of the Invention

This invention relates to integrated circuit design and, more particularly, to electronic design automation tools providing integrated circuit custom block composition.

2. Description of the Related Art

During the integrated circuit (IC) design process the logic designers typically create the various circuits using a hardware definition language such as Verilog or very high speed IC hardware description language (VHDL). In these and similar languages, the operation of synchronous digital circuits may be described using a register transfer level (RTL) description. Typically the RTL describes the circuit's behavior in terms of the signal flow (or data transfer) through hardware registers and combinatorial logic. The RTL may be synthesized into a gate level description or netlist using a synthesis tool. The output of the synthesis tool may be used by a place and route tool to generate a physical layout of the IC. The physical layout represents the physical locations of each transistor and the wiring and interconnections to those transistors. The physical layout output may include a file such as a GDSII file, for example, which may be used to create a mask set for use in the actual manufacturing process of the IC.

The place and route tool creates the physical layout from the netlist and a library of components that make up the IC. For example, the library may include a vast number of standard cells that may be used in many different ICs. A typical standard cell library may include a variety of commonly used and basic circuit gates and components such as AND, NAND, OR, and NOR gates, for example, as well as inverters, flip-flops, and the like. In some cases, the standard cell library may already exist from other IC designs that used that facility and technology. These standard library cells include information that corresponds to the transistor drive strength, the characteristics of the given transistors for a given process, and the like. Standard library cells are typically the same size such that when a standard block is created the standard cells in a row are all the same width.

Custom cells or leafcells, on the other hand are non-standard cells that define a special function such as, for example a decoder for a memory block. Custom cells may include some standard library cells. A custom block may be a large block created from both standard library cells and custom cells. A custom block may represent a larger function. In the example above, the custom block may be the entire memory block.

During the placement operation of the IC design, the cells and blocks may be physically placed into an IC floorplan and the route portion connects everything together by routing the wires. The place and route tool uses a number of rules to determine where to place the components. For example, total wire length, timing of the longest delay paths, congestion, and power minimization, may be taken into account. The routing portion includes figuring out how to connect all the components and creating all the wires to do it.

Conventional automated place and route tools do a relatively good job of producing circuit block designs that meet timing when the cells within the blocks are chosen from standard library cells. However, when custom blocks are created using non-standard library cells, in many cases, the conventional automated place and route tools may have a difficult time, at best, placing non-standard-width custom leafcells and meeting timing. In such cases, a person such as a mask designer will have to go back into the design and manually place leafcells and re-route many wires. This can be a tedious task that can take a long time, thereby adding time to the design cycle, which may directly translate to lost opportunities and lost dollars.

SUMMARY

Various embodiments of a block composition tool for use in an integrated circuit design flow when using non-standard library cells are disclosed. In one embodiment, a method includes creating a placement control file including instructions for use by a custom block composition tool to place the one or more non-standard library cells into the custom block of an IC design layout. The method may also include executing program instructions that comprise a custom block composition tool, and which compose the custom block by instantiating a leafcell for each non-standard library cell and for each standard library cell included in a netlist of the custom block. Each leafcell may comprise a layout view of each of the non-standard library cells and each of the standard library cells. The method may also include accessing the placement control file and placing each leafcell in a row of the custom block layout according to the placement control file. The method may also include tagging power, clock, and critical network signals within the custom block. The tags may identify the pre-routed signals as preserved and "do not touch" within the custom block layout. The method may also include generating a router control file such as a router.do file for example, that includes the information used by a router design tool during remaining routing of the custom block. Finally the method may include providing the pre-routed custom block, including the tags, to the router design tool such that the router design tool routes any remaining signals of the custom block according to the router control file.

In another embodiment, an automatic block composition tool for composing a custom block of an integrated circuit (IC) design in which the custom block may comprise one or more non-standard library cells, includes program instructions storable on a computer readable medium. The program instructions are executable by a processor to create a placement control file including instructions for use by the automatic custom block composition tool to place the one or more non-standard library cells into the custom block of the IC design layout. In addition the program instructions may be executable to instantiate a leafcell for each non-standard library cell and for each standard library cell included in a netlist of the custom block of the IC design. Each leafcell may comprise a layout view of each of the non-standard library cells and each of the standard library cells. The program instructions may also be executable to access the placement control file and to place each leafcell in a row of the custom block of the IC design layout according to the placement control file. The program instructions may also be executable to pre-route and tag as non-routable or "do not touch" power, clock, and critical network signals within the custom block. The program instructions may also be executable to specify information associated with one or more metal layers of the custom block and to generate a router control file that includes the information for use by router design tool during remaining routing of the custom block. Further, the program instructions may be executable to provide the pre-routed custom block, including the tags, to the router design tool such that the router design tool routes any remaining signals of the custom block.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. It is noted that the word "may" is used throughout this application in a permissive sense (i.e., having the potential to, being able to), not a mandatory sense (i.e., must).

DETAILED DESCRIPTION

Figure 2:
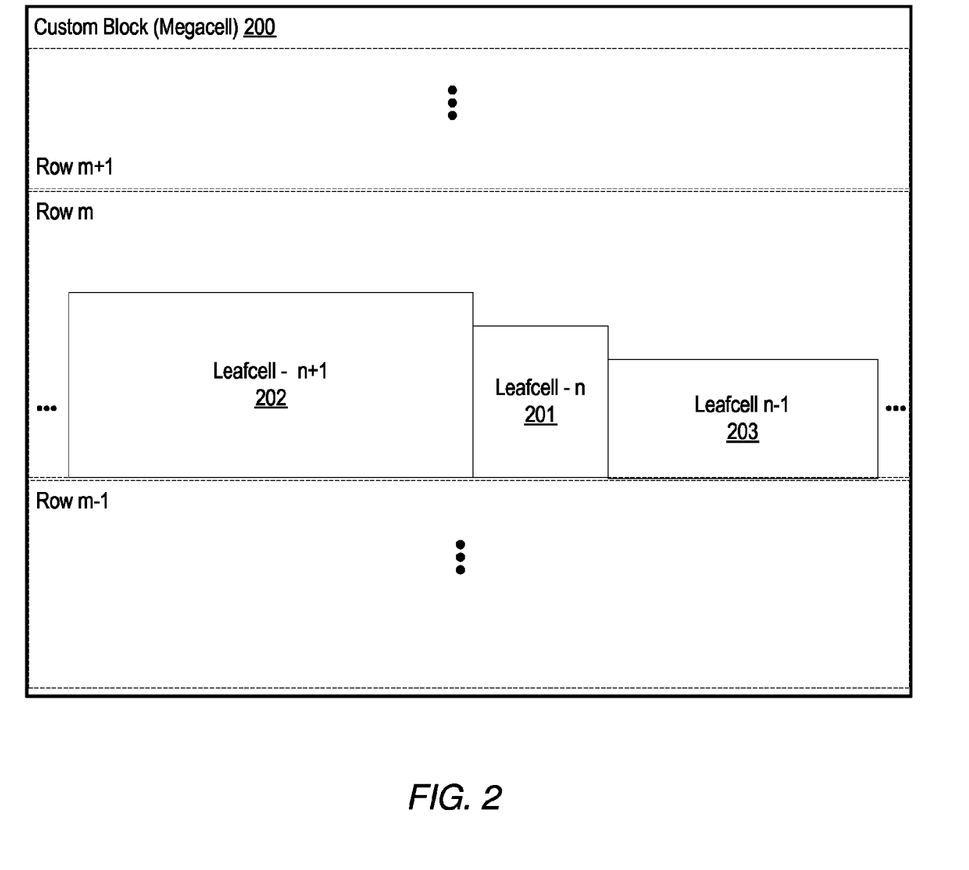
FIG. 2 is a diagram depicting an integrated circuit physical layout of one embodiment of a custom block that includes a standard cell and two custom cells.

As described above, during the design flow, various IC components are created from standard library cells that were created for a given wafer fabrication facility, and a given technology (i.e., device geometry) within that wafer fabrication facility using characterizations data available from the facility. In addition, a number of custom cells may also be used to create other larger custom components or blocks. As shown in FIG. 2, the custom blocks may include both standard cells and custom cells that may be non-uniform in size when compared to the standard library cells. Since conventional place and route tools may not be capable of placing and routing custom blocks that are composed of non-standard cells, particularly when the timing and area requirements are critical, a custom design tool and flow (referred to the megacell flow) is created to automatically compose custom blocks.

As described further below in conjunction with the description of FIG. 1, some of the features in the custom block composition of the megacell flow include, for example, placing instantiations of custom and standard cells into the IC floorplan, routing power, circuit ground, and pre-routing critical nets, and inserting clock headers and scan and mux buffers within the custom block. Once the custom block is complete, the IC design may be handed back to the conventional design flow so that the conventional place and route tool may connect the custom block inputs and outputs to the rest of the IC.

The megacell flow comprises a computer program that uses a programming language such as SKILL to create a custom placement and pre-routing design tool sometimes referred to as the megacell flow tool. The megacell flow tool may automatically generate various custom place and pre-route functions, and provide the resulting pre-routed custom blocks along with routing instructions to the conventional route design tool. Thus, as described in greater detail below, once the standard library cells and any custom cells and custom cell templates are created and placed in a respective libraries, the megacell tool may place and pre-route critical nets to compose the custom block.

Figure 1:
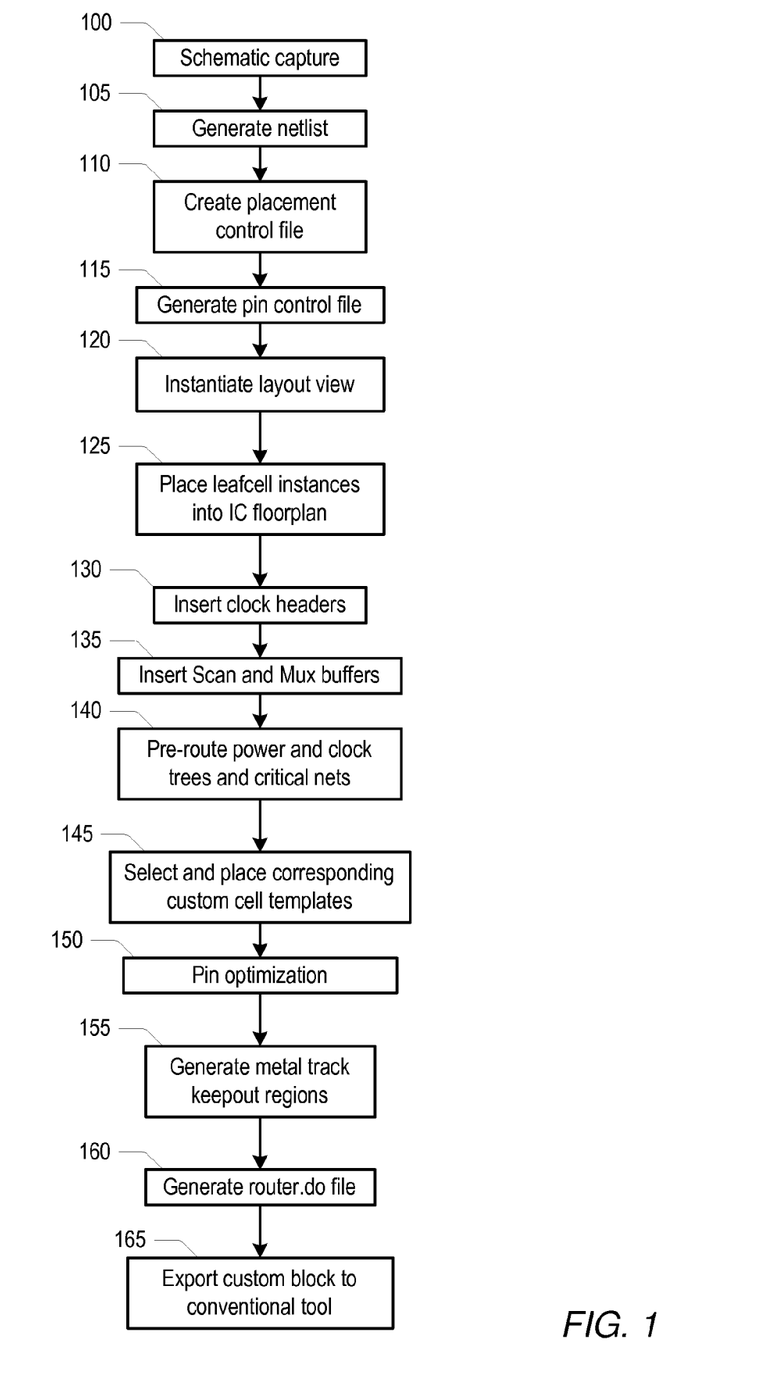
FIG. 1 is a flow diagram describing one embodiment of a design flow for use during the design of an integrated circuit.

Turning now to FIG. 1, a flow diagram describing one embodiment of a custom design flow for use in the design of an integrated circuit (IC) is shown. Beginning in block 100, schematic representation of the integrated circuit is created or synthesized from a hardware description language representation such as RTL, for example. This is referred to as schematic capture. In addition, the RTL circuit representation may be synthesized into a netlist by a synthesis tool (block 105). Using SKILL coding, an initial placement control file (PCF) is created (block 110). The placement control file controls the operation of the custom place and pre-route engine during the custom block composition. An initial pin control file is also created (block 115). The pin control file may control the initial placement of the pins of the custom block.

Upon execution of the megacell flow SKILL code, the leafcells, which include both the custom cells and standard library cells that will be used in the custom block are instantiated into a layout view, and the pins and connectivity of the leafcells are mapped (block 120). The placement control file may create an IC floor plan. Floorplanning the IC typically refers to creating a bird's eye view of the IC, taking into account any IC design limitations, such as overall die size, pad size, and the like, for example. Using the PCF, the leafcell instances are placed in rows (block 125). The PCF may be modified on the fly to optimize cell placement and orientation. The leafcells are usually arranged in rows across the IC floorplan. For example, in FIG. 2, a diagram depicting one embodiment of an IC floorplan including a physical layout of leafcells that includes standard library cells and custom cells is shown. In FIG. 2, row n includes a leafcell n, a leafcell n+1, and a leafcell n−1, where leafcell n is a standard library cell having a standard width. Thus, leafcell n−1 is a non-standard library cell with a width substantially equal to 2×, and leafcell n+1 is a non-standard library cell with a width substantially equal to any multiple of a standard cell width.

Referring back to FIG. 1, the megacell flow tool inserts and places standard library clock header cells having the correct drive strength. Typically the clock header cells may be placed close to flip-flop rows to reduce clock skew (block 130). The megacell flow tool also inserts and places scan buffer and mux select buffers such that the drivability of this type of high-fanout critical net may be supported for correct operation (block 135). The megacell flow tool pre-routes power and clock trees and other critical nets such as the chip enable signals, scan clocks and the like, with specific metal layers, metal pitch according to projected power and clock templates (block 140).

During the pre-route stage, the megacell flow tool may search for and select custom cell templates for certain cells found in the layout. For example, a mux select signal may be a high-fanout net. As such, even though it is possible that a mux cell may be a standard library cell, the mux select signal may have critical timing, which may not be correctly routed by the conventional place and route tool alone. Thus, in one embodiment, the megacell flow tool may identify one or more of the mux cells, by instance name, in a given row. In response, the megacell flow tool may search the library for a corresponding mux cell template. If such a template is found, the megacell tool may open the template file, copy the contents, and overlay the contents onto each mux cell instance in the row (block 145). In one embodiment, a custom cell template may include information such as metal polygon structures that are used to interconnect the cell connections in the corresponding cell in a predetermined way. Each unique custom cell template may be created during creation of the cell library. The cell template may have the same cell size, and have the cell name as the cell for which it was created. Thus by using the custom cell template, the megacell flow tool may route the mux select signal using substantially straight runs, thereby allowing the high-fanout net to meet timing. It is noted that a custom cell template may be created for any cell, and that the mux select template is used here only as one example. The pre-routed nets may be labeled or tagged as preserved or "do not touch." The preserved designation informs the conventional router tool not to attempt to route or modify any pre-routes in the custom block.

The megacell flow tool may provide local design rules for edge pins of custom blocks. More particularly, the megacell tool may optimize custom block edge pins by placing the custom block input and output (I/O) edge pins at a predetermined distance from the block boundary (block 150). In one embodiment, the distance is substantially equal to one-half design rule check (DRC) distance. This placement reduces or eliminates pin shorting when two custom blocks are placed adjacent and abutting one another in the composition. It is noted that in other embodiments, this distance may be specified to be different than a distance of one-half DRC.

Figure 6:
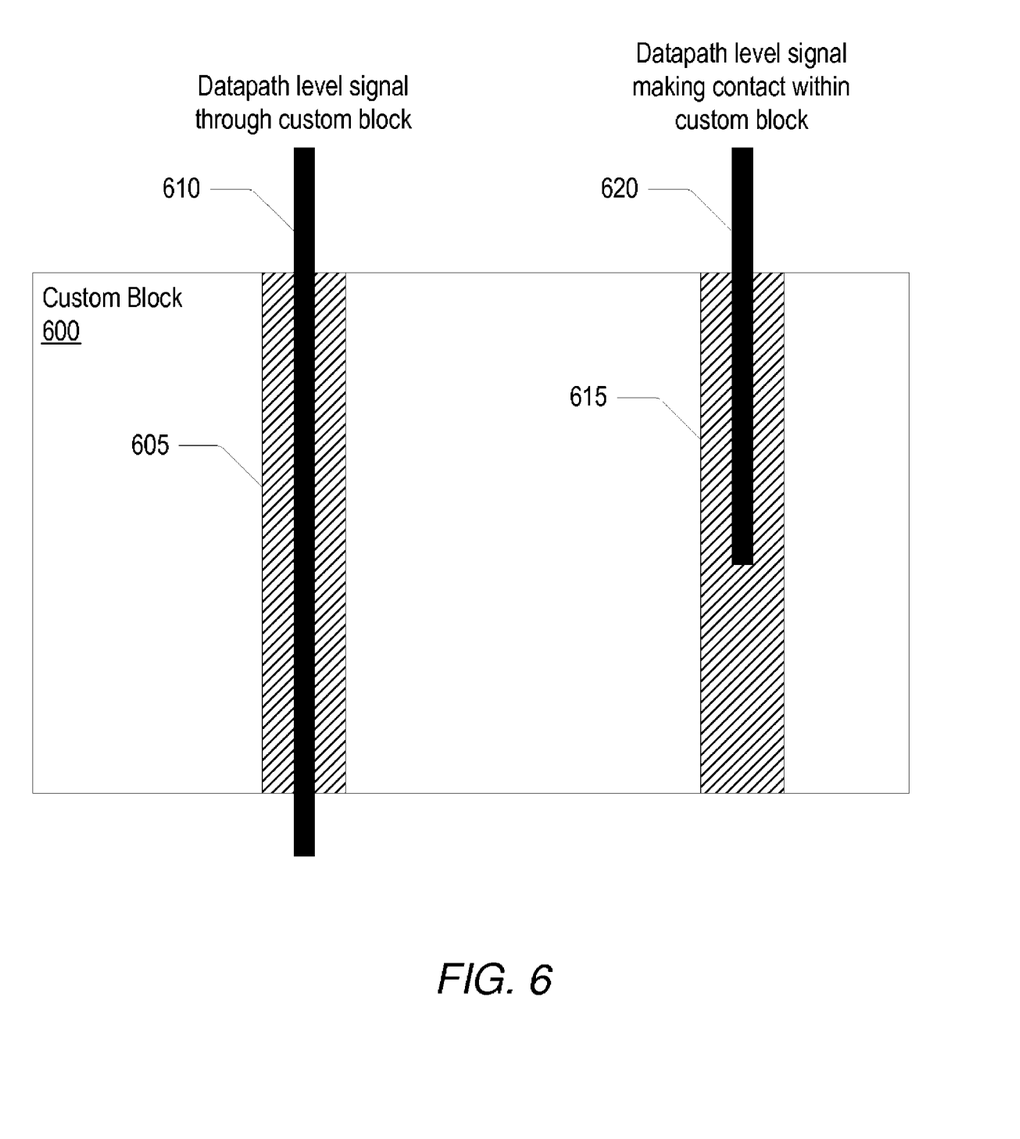
FIG. 6 is a diagram depicting a physical layout of one embodiment of a custom block including metal layer keepout regions.

In one embodiment, the megacell flow tool may identify connections within the custom block based upon higher-level routing information passed to the megacell flow tool. In addition, the megacell flow tool may identify higher-level signal routes that must pass through the boundary of a custom block. In such cases, the megacell flow tool may generate a metal layer keepout region wherever the higher level signal must either pass though the custom block, or make a connection within the custom block (block 155). The metal layer keepout regions force the conventional routing tool to keep any metal out of the area defined by the keepout region so that the next level hierarchy routing may use that space for routing wires. Exemplary keepout regions are shown in FIG. 6.

The megacell flow tool may also create a file referred to as a route.do file for use by the conventional router design tool (block 160). The route.do file may be a file that directs the conventional router design tool to perform the functions and execute the files listed in the route.do file. The route.do file may also include information required by the conventional router design tool to route the remaining signals in the custom block. For example, the megacell flow tool may generate all the above information and files required by the router tool engine. In one embodiment, the megacell flow tool creates the technology rules file, the basic metal routing rules, instance routing connectivity, and error checking messages using, for example, a script.

In one embodiment, the megacell flow tool may export the pre-routed custom block, including the tags, to the conventional router design tool flow, which may route the remaining signals in the custom block (block 165). The conventional router design tool routes the specific metal layers identified in the route.do file (block 165). In one embodiment, the conventional router design tool may route, for example, embedded megacell (EMC) metal 1-4, and standalone megacell (SMC) metal 1-6. In one embodiment, when the conventional router design tool completes the metal routing, the custom block composition may be complete. Accordingly, the custom block may be imported back into the megacell tool for post processing optimizations including DRC fixing, metal fill and decoupling capacitor changes, for example.

It is noted that some of the blocks depicted in FIG. 1 are shown in the order they are for discussion purposes. Accordingly, it is contemplated that in other embodiments, some of the blocks may be arranged in a different order.

Figure 3A:
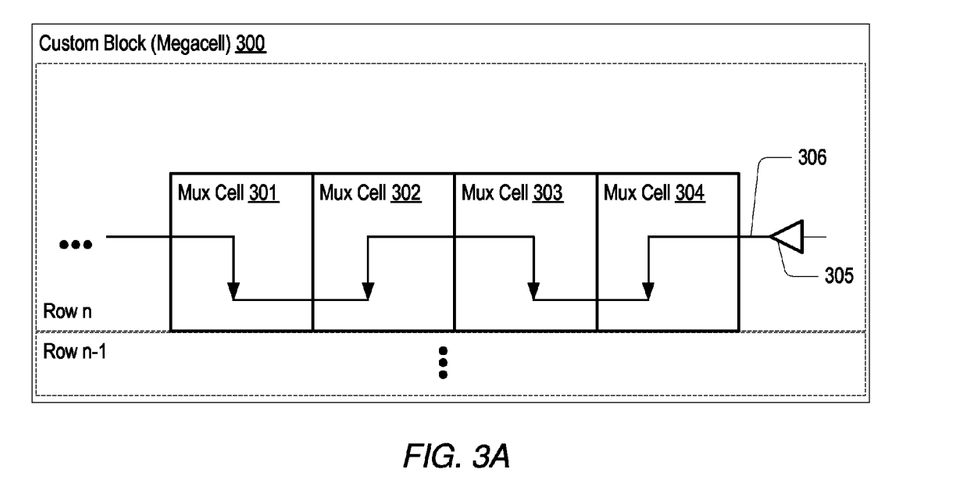
FIG. 3A is a diagram depicting an integrated circuit physical layout and routing of a multiplexer select signal through a custom block that includes a plurality of custom multiplexer cells by an automated conventional routing tool.
Figure 3B:
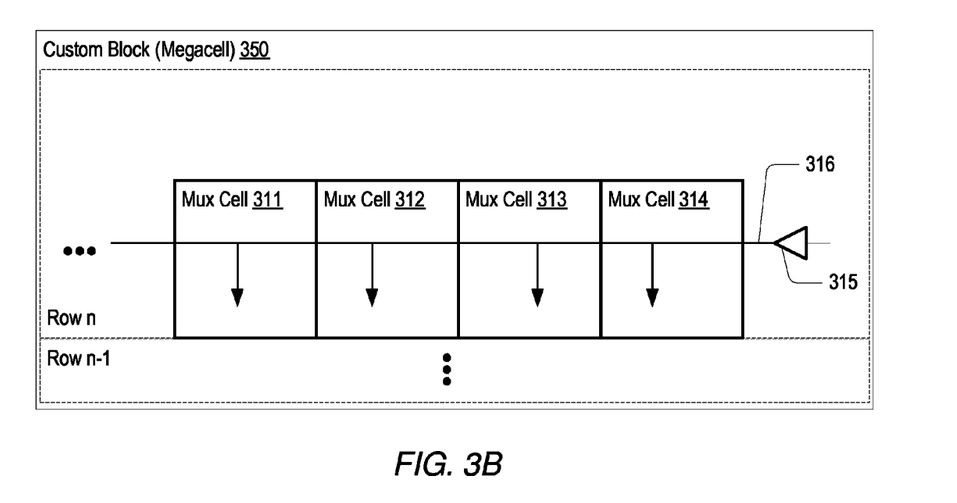
FIG. 3B is a diagram depicting one embodiment of an integrated circuit physical layout and routing of a multiplexer select signal through a custom block that includes a plurality of custom multiplexer cells using a custom cell template.

FIG. 3A and FIG. 3B illustrate contrasting routing of a mux select signal through a custom block that includes a row of muxes. Turning to FIG. 3A, a diagram depicting a row of mux cells is shown. In one embodiment, the mux cells are designated 301 through 304. In addition, the control signals to the mux cells may be mux select signals that are provided to all the mux cells in the row, thus creating a high-fanout mux select signal net. As shown, signal 306 is a mux select signal.

In the absence of a custom cell template, a place and route tool may attempt to route a high-fanout signal such as mux select signal 306 in an inefficient and rather zig-zagged manner from a buffer cell 305 through the custom mux cells 301-304, as shown. This routing shown in FIG. 3A may not meet delay path timing requirements.

Referring to FIG. 3B, similar to FIG. 3A, a row of mux cells is shown. In one embodiment, the mux cells are designated 311 through 314. As above, the control signals may be mux select signals that are provided to all the mux cells from a buffer cell 315, thus creating a high-fanout mux select signal net. As shown, signal 316 is a mux select signal.

Figure 4A:
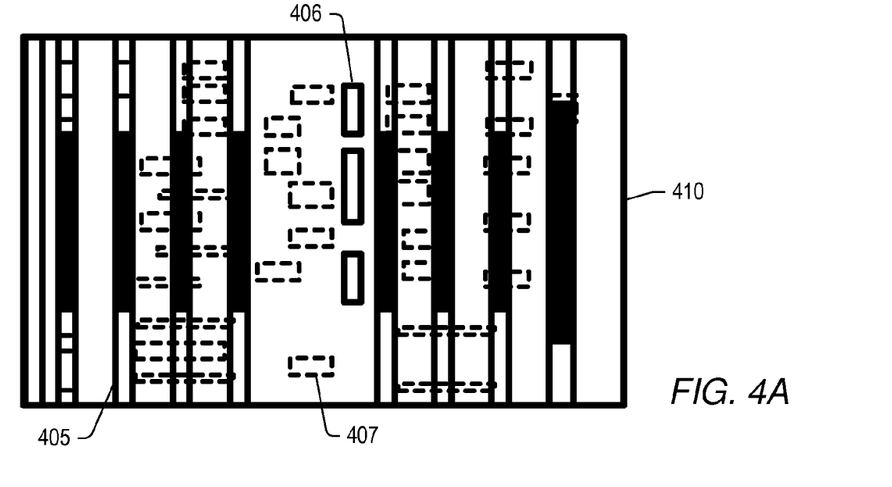
FIG. 4A is a diagram depicting one embodiment of a custom cell layout.
Figure 4B:
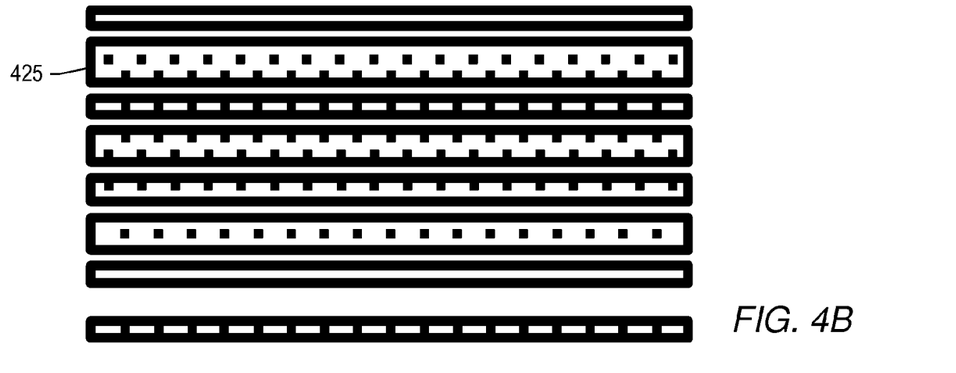
FIG. 4B is a diagram depicting one embodiment of a custom cell template that corresponds to the custom cell shown in FIG. 4A.

However, in contrast to the routing shown in FIG. 3A, a custom cell template such as a custom mux select template 425 of FIG. 4B is used. Accordingly, the mux select routing is done efficiently, in substantially straight lines as shown in FIG. 3B, such that delay path timing requirements may be met.

It is noted that although cells 311-314 shown in FIG. 3B are mux cells, it is contemplated that in other embodiments, the cells may represent any custom or standard library cell that may include a high fanout net. In such embodiments, a custom cell template may be used to route the high fanout net, An exemplary custom multiplexer (mux) cell including various circuit polygons is shown in FIG. 4A. In the illustrated embodiment, the custom mux cell includes a cell boundary 410, a plurality of mux cell structures (e.g., 405, 406, and 407). For example, 405 may represent a power net, 406 may represent muxsel pins, and 407 may represent internal metal connections. It is noted that in a custom block as described above, one or more of these mux cells may be placed in a row.

Figure 4C:
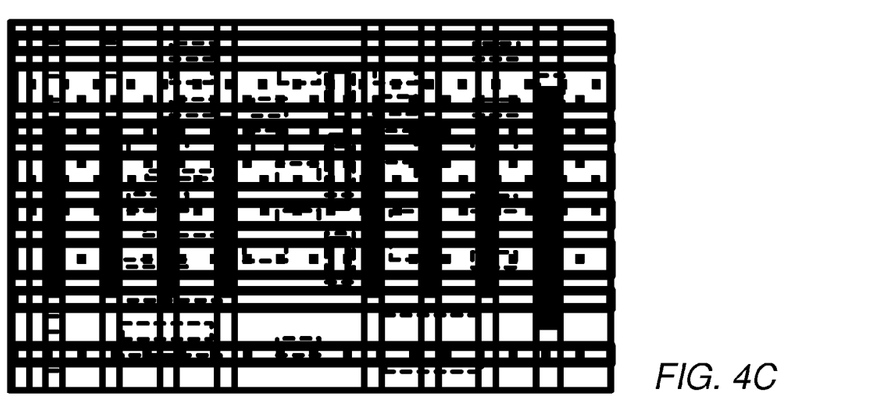
FIG. 4C is a diagram depicting one embodiment of a custom cell layout overlaid with the custom cell template of FIG. 4B.

In FIG. 4B, a custom mux select template including metal layer polygons 425 (i.e., wires) is shown. These metal layer polygons comprise the mux select wires for the custom mux cell of FIG. 4A. As described above and shown in FIG. 4C, the mux template may be overlaid onto each mux cell such that the metal polygons in the mux cell select template form pre-routed connections for the mux select connections in the mux cell.

Figure 5:
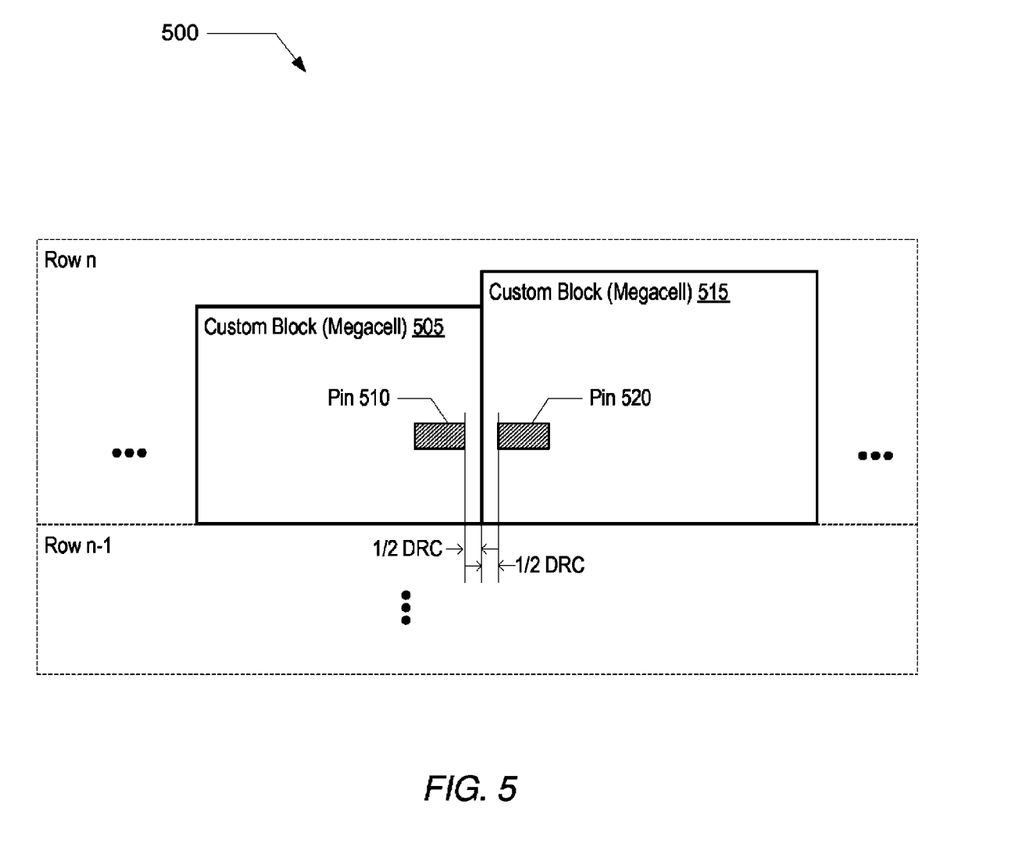
FIG. 5 is a diagram depicting an embodiment of a datapath layout of two exemplary custom blocks that abut one another.

Turning to FIG. 5, a diagram of one embodiment of edge pin spacing of a physical layout of two exemplary custom blocks that abut one another is shown. On row n of the physical layout 500 of an exemplary IC, custom block 505 is adjacent to and abutting custom block 515. As shown, pin 510, and pin 520 have each been placed a distance of one-half DRC away from its respective custom block boundary.

In one embodiment, to save die area custom blocks may be placed next to each other in a row such that the boundaries touch. In conventional designs the connection pins may be placed at the boundary edge. Consequently, if the layout is not reworked by hand on such designs, a pin from one block may touch a pin in an adjacent block causing a short circuit. Accordingly, the megacell flow tool described above in conjunction with the description of FIG. 1, may place the pins one-half DRC distance from the custom block boundary during pin optimization.

Turning to FIG. 6, a diagram depicting of a physical layout of one embodiment of a custom block including metal track keepout regions is shown. As shown, custom block 600 includes a metal track keepout region 605 and a metal track keepout region 615. In one embodiment, metal track keepout region 605 may provide a region through which a next higher-level signal 610 may be routed through the custom block 600 on a particular metal layer. Similarly, metal track keepout region 615 may provide a region through which another higher-level signal 620 may be routed into and make a connection within the custom block 600. The metal track keepout regions 605 and 615 may allow the custom blocks and the higher-level blocks to share metal resources. Thus, in one embodiment, the megacell flow tool may identify, based upon information input to the megacell flow tool, where the higher-level signals pass-through or connections are within the custom blocks and automatically place the keepout regions over those areas, thereby preventing metal layer routing over these areas.

As described above, the megacell tool may comprise program instructions written in a language such as SKILL. The electronic design automation (EDA) tools, including the conventional router design tool and synthesis tool may be off-the shelf software products. Accordingly, the megacell flow tool and the EDA tools may comprise program instructions that execute on one or more processors of a computer system.

Figure 7:
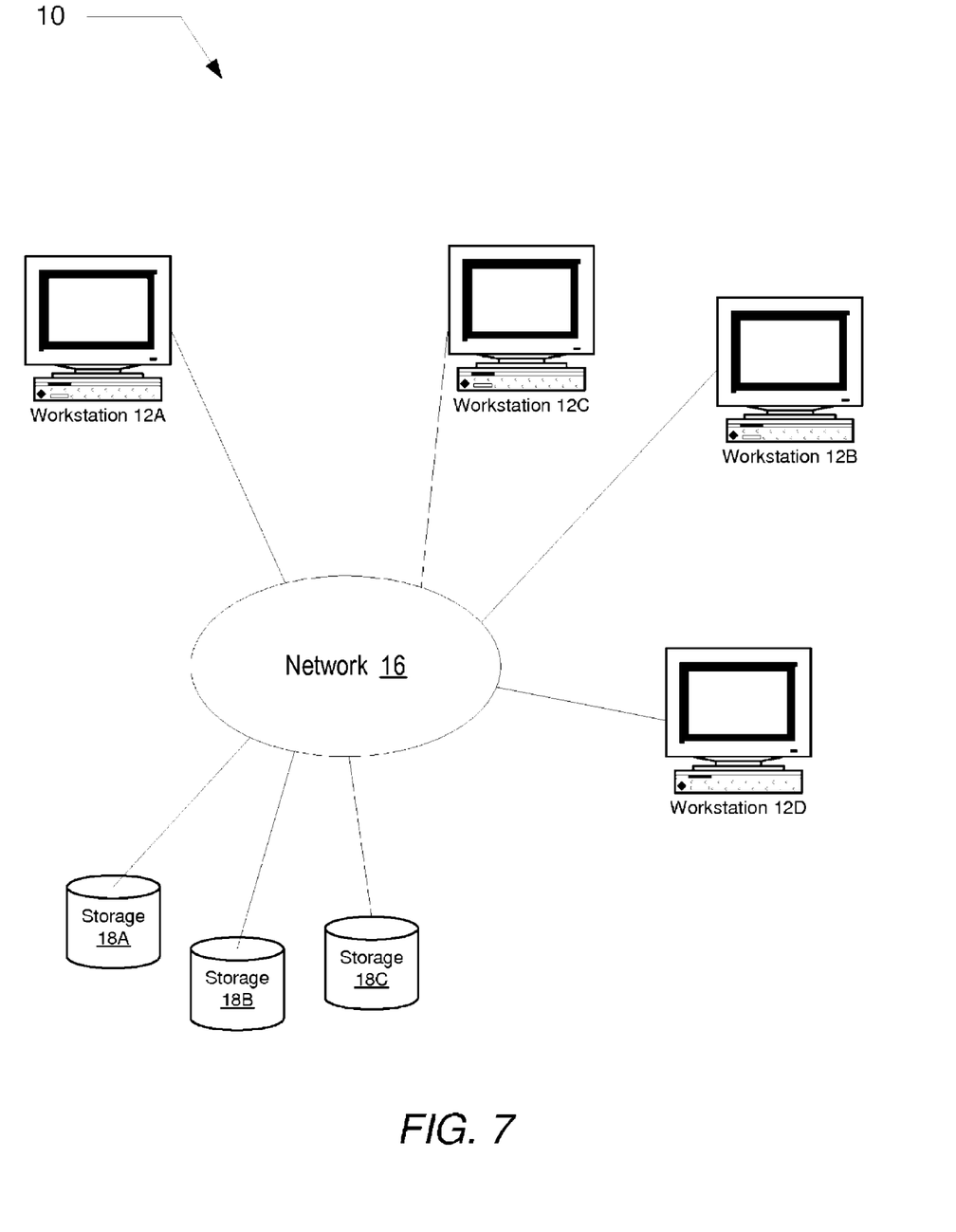
FIG. 7 is a block diagram of an exemplary computer system used to implement an IC design.

Turning to FIG. 7, a block diagram of one embodiment of a computer system is shown. Computer system 10 includes a plurality of workstations designated 12A through 12D. The workstations are coupled together through a network 16 and to a plurality of storages designated 18A through 18C. In one embodiment, each of workstations 12A-12D may be representative of any standalone computing platform that may include, for example, one or more processors, local system memory including any type of random access memory (RAM) device, monitor, input output (I/O) means such as a network connection, mouse, keyboard, monitor, and the like (all not shown for simplicity).

In one embodiment, storages 18A-18C may be representative of any type of mass storage device such as hard disk systems, optical media drives, tape drives, ram disk storage, and the like. As such, the program instructions comprising the design tools and the megacell tool SKILL code may be stored within storages 18A-18C and loaded into the local system memory of any of the workstations during execution. Additionally, the program instructions may be stored on a portable/removable storage media. The program instructions may be executed directly from the removable media or transferred to the local system memory or mass storages for subsequent execution. As such, the local system memory and the mass storages may be referred to as computer readable mediums. The program instructions may be executed by the one or more processors on a given workstation or they may be executed in a distributed fashion among the workstations, as desired.

The standard cell library and the custom cell files may be stored in a database within any of the storage 18A-18C. Similarly, the resulting netlist and layout files produced by the design tools may also be stored on storages 18A-18C.

It is noted that although the computer system shown in FIG. 7 is a networked computer system, it is contemplated that in other embodiments, each workstation may also include local mass storage. In such embodiments, the program instructions and the results of the design tools may be stored locally. Further, it is contemplated that the program instructions may be executed on a standalone computer such as a personal computer that includes local mass storage and a system memory.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method for automatically composing a custom block of an integrated circuit (IC) design layout, wherein the custom block comprises one or more non-standard library cells, the method comprising:
   creating a placement control file including instructions for use by a custom block composition tool to place the one or more non-standard library cells into the custom block of an IC design layout;
   a computer executing program instructions that comprise a custom block composition tool which compose the custom block by:
      instantiating a leafcell for each non-standard library cell and each standard library cell included in a netlist of the custom block, wherein each leafcell comprises a layout view of each of the non-standard library cells and the standard library cells;
      accessing the placement control file and placing each leafcell in a row of the custom block according to the placement control file;
      pre-routing and tagging power, clock, and critical network signals within the custom block, wherein the tags specify the pre-routed signals are not modifiable by a router design tool;
      specifying information associated with one or more metal layers of the custom block;
      generating a router control file that includes the information used by a router design tool during remaining routing of the custom block;
      providing the pre-routed custom block, including the tags, to the router design tool such that the router design tool routes any remaining signals of the custom block.

2. The method as recited in claim 1, further comprising creating a template cell corresponding to a particular leafcell, wherein a given template cell includes predetermined routing information for the corresponding respective leafcell.

3. The method as recited in claim 2, wherein the predetermined routing information includes metal layer polygons used to interconnect predetermined connection points within each leafcell.

4. The method as recited in claim 2, wherein a given template cell is substantially the same size as the corresponding respective leafcell.

5. The method as recited in claim 2, further comprising the custom block composition tool further composing the custom block by:
  identifying one or more same respective leafcells in a row of the custom block, and selecting a corresponding template cell;
  creating an overlay for each of the one or more same respective leafcells in the row by copying the predetermined routing information into each of the one or more same respective leafcells; and
  pre-routing interconnection signals for each of the one or more same respective leafcells according to the predetermined routing information of each overlay.

6. The method as recited in claim 1, further comprising the custom block composition tool further composing the custom block by inserting a metal track keepout region which defines an area on a given metal layer within a given custom block, within which no metal may be placed, based upon information specifying one or more higher level signals that need routing space within the area on a given metal layer within the given custom block.

7. The method as recited in claim 1, further comprising the custom block composition tool further composing the custom block by placing custom block edge pin connections a distance of substantially one-half design rule check (DRC) from a boundary of a given custom block.

8. The method as recited in claim 1, further comprising the custom block composition tool further composing the custom block by inserting and placing standard library clock header cells within the custom block of the IC design layout.

9. An automatic block composition tool for composing a custom block of an integrated circuit (IC) design layout, wherein the custom block comprises one or more non-standard library cells, the automatic custom block composition tool comprising program instructions storable on a non-transitory computer readable medium, and executable by a processor to:
  create a placement control file including instructions for use by the automatic custom block composition tool to place the one or more non-standard library cells into the custom block of an IC design layout;
  instantiate a leafcell for each non-standard library cell and each standard library cell included in a netlist of the custom block, wherein each leafcell comprises a layout view of each of the non-standard library cells and the standard library cells;
  access the placement control file and placing each leafcell in a row of the custom block according to the placement control file;
  pre-route and tag power, clock, and critical network signals within the custom block, wherein the tags specify the pre-routed signals are not modifiable by a router design tool;
  specify information associated with one or more metal layers of the custom block;
  generate a router control file that includes the information used by the router design tool during remaining routing of the custom block;
  provide the pre-routed custom block, including the tags, to the router design tool such that the router design tool routes any remaining signals of the custom block.

10. The automatic block composition tool as recited in claim 9, wherein the program instructions are further executable by the processor to:
  identify one or more same respective leafcells in a row of the custom block, and selecting a corresponding template cell;
  create an overlay for each of the one or more same respective leafcells in the row by copying the predetermined routing information into each of the one or more same respective leafcells; and
  pre-route interconnection signals for each of the one or more same respective leafcells according to the predetermined routing information of each overlay.

11. The automatic block composition tool as recited in claim 10, wherein the predetermined routing information includes metal layer polygons used to interconnect predetermined connection points within each leafcell.

12. The automatic block composition tool as recited in claim 9, wherein the program instructions are further executable by the processor to insert a metal track keepout region which defines an area on a given metal layer within a given custom block, within which no metal may be placed, based upon information specifying one or more higher level signals that need routing space within the area on a given metal layer within the given custom block.

13. The automatic block composition tool as recited in claim 9, wherein the program instructions are further executable by the processor to place custom block edge pin connections a distance of substantially one-half design rule check (DRC) from a boundary of a given custom block.

14. The automatic block composition tool as recited in claim 9, wherein the program instructions are further executable by the processor to insert and place standard library clock header cells within the custom block of the IC design layout.

15. A system comprising:
  a memory configured to store program instructions which implement an automatic block composition tool for composing a custom block of an integrated circuit (IC) design layout, wherein the custom block comprises one or more non-standard library cells;
  a processor coupled to the memory and configured to execute the program instructions to:
    create a placement control file including instructions for use by the automatic custom block composition tool to place the one or more non-standard library cells into the custom block of an IC design layout;
    instantiate a leafcell for each non-standard library cell and each standard library cell included in a netlist of the custom block, wherein each leafcell comprises a layout view of each of the non-standard library cells and the standard library cells;
    access the placement control file and placing each leafcell in a row of the custom block according to the placement control file;
    pre-route and tag power, clock, and critical network signals within the custom block, wherein the tags specify the pre-routed signals are not modifiable by a router design tool;
    specify information associated with one or more metal layers of the custom block;
    generate a router control file that includes the information used by the router design tool during remaining routing of the custom block;
    provide the pre-routed custom block, including the tags, to the router design tool such that the router design tool routes any remaining signals of the custom block.

16. The system as recited in claim 15, wherein the program instructions are further executable by the processor to:
  identify one or more same respective leafcells in a row of the custom block, and selecting a corresponding template cell;

create an overlay for each of the one or more same respective leafcells in the row by copying the predetermined routing information into each of the one or more same respective leafcells; and pre-route interconnection signals for each of the one or more same respective leafcells according to the predetermined routing information of each overlay.

17. The system as recited in claim 16, wherein the predetermined routing information includes metal layer polygons used to interconnect predetermined connection points within each leafcell.

18. The system as recited in claim 15, wherein the program instructions are further executable by the processor to insert a metal track keepout region which defines an area on a given metal layer within a given custom block, within which no metal may be placed, based upon information specifying one or more higher level signals that need routing space within the area on a given metal layer within the given custom block.

19. The system as recited in claim 15, wherein the program instructions are further executable by the processor to place custom block edge pin connections a distance of substantially one-half design rule check (DRC) from a boundary of a given custom block.

20. The system as recited in claim 15, wherein the program instructions are further executable by the processor to insert and place standard library clock header cells within the custom block of the IC design layout.

21. The system as recited in claim 15, wherein the program instructions comprise instructions programmed in a SKILL programming language interpreted by the router design tool.

* * * * *